United States Patent [19]
Prescaro, Jr.

[11] Patent Number: 5,283,404
[45] Date of Patent: Feb. 1, 1994

[54] MINIMUM FLOAT, SERVICEABLE CENTER BLOW HORN SWITCH IN DRIVER SIDE AIR BAG MODULE

[75] Inventor: Ronald A. Prescaro, Jr., Ogden, Utah

[73] Assignee: Morton International, Inc., Chicago, Ill.

[21] Appl. No.: 889,558

[22] Filed: May 27, 1992

[51] Int. Cl.⁵ .............................................. H01H 9/00
[52] U.S. Cl. ................................ 200/61.54; 200/61.55
[58] Field of Search .................... 200/61.54–61.57; 280/728–735, 777; 74/484 R, 484 H, 552

[56] References Cited

U.S. PATENT DOCUMENTS

| | | | |
|---|---|---|---|
| 4,325,568 | 4/1982 | Clark et al. | 280/731 |
| 4,785,144 | 11/1988 | Fosnaugh et al. | 200/61.55 |
| 5,036,169 | 7/1991 | Sakane | 200/61.54 |
| 5,085,461 | 2/1992 | Shibata | 280/731 |

Primary Examiner—J. R. Scott
Attorney, Agent, or Firm—Mark F. LaMarre; Gerald K. White

[57] ABSTRACT

An improved horn switch assembly for use on the steering wheel of a motor vehicle, which horn switch assembly can be activated by pressing on the module cover. The novel horn switch assembly is attached to the bottom of the air bag module. The horn switch assembly comprises a horn switch located between the module housing of the air bag module and a second support bracket for attaching the module to a vehicle steering wheel. This novel horn switch assembly permits servicing or replacement of the horn switches without exposing the internal components of the air bag module.

5 Claims, 5 Drawing Sheets

MINIMUM FLOAT, SERVICEABLE CENTER BLOW HORN SWITCH IN DRIVER SIDE AIR BAG MODULE

BACKGROUND OF THE INVENTION

1. Field of the Invention

This invention relates generally to inflatable type modular occupant restraint systems for passenger vehicles or, as they are more commonly known, air bag restraint systems. Such a system may be installed in an automobile or other vehicle, at least in part on the steering wheel for the protection of the driver and also in the dashboard or passenger side instrument panel for passenger protection in the event of a collision. More particularly, this invention relates to an improved horn switch arrangement included in a steering wheel having an air bag restraint system installed therein.

2. Description of Related Art

Horn blowing switch arrangements for steering wheel having inflatable occupant restraint modules are known. Dunford et al., U.S. Pat. No. 3,819,205 discloses a modular occupant restraint system in which an inflator, an inflatable cushion or air bag, and a generally rectangular cover or container for the cushion are all assembled on a support plate which, in turn, is mounted to the steering wheel. Extending from each upper corner of the cover is a portion which is provided with a horn blowing switch of the finger deflectable or pressure actuated push button type. A problem with this arrangement is that when access to the switches for repair or replacement is necessary, the cover must be disassembled from the support plate before the switches are exposed.

Hiramitsu et al., U.S. Pat. No. 5,002,306 discloses an occupant restraint system having a plurality of membrane switches of plane rectangular shape applied to and arranged on the upper surface of the upper wall of a soft synthetic resin pad of a steering wheel, except for a break-open area defined by a thinned breaking portion in H-like shape. The manner of attachment of the switches to the pad is not specified. It is contemplated that the membrane switches may be arranged on the rear surface of the upper wall of the pad. There are several disadvantages with these arrangements. The soft synthetic resin pad is rather deficient in respect to providing a suitable reaction surface for horn switch actuation. Servicing or replacement of the switches necessarily involves exposing internal components of the air bag module assembly, particularly in the case of applying the switches to the rear of the pad, and probably also when the switches are applied to the upper surface thereof because of the probability of damaging the pad when attempting to remove the switches for repair or replacement. Additionally, the arrangement of the lead wires from the membrane switches along side wall portions of the pad to a horn actuating circuit within the vehicle, as illustrated and described, leaves much to be desired in an occupant restraint system that is expected to be operable over the like of the vehicle which may be ten (10) years or more.

Fosnaugh et al., U.S. Pat. No. 4,785,144 discloses a modular occupant restraint system in which a horn blowing switch is actuated when the module cover is depressed. The horn blowing switch includes a support that is mounted within the hub portion of the steering wheel and is provided with a plurality of bolts each of which supports a sleeve member. The bolts thread into the inflatable restraint module. Springs between the support and restraint module space the sleeves from the support. Depression of the module engages the sleeve members with the support to complete the circuit to blow the horn. The horn switch is integral to the steering wheel. However, access to the switch for repair and replacement requires disassembly of the module. Another problem is that the avoidance of the effects of vibration on the module, transmitted from the steering wheel, requires the use of relatively strong springs. This, in turn, requires a relatively strong pressing force on the module in order to operate the horn.

SUMMARY OF THE INVENTION

An object of this invention is to provide a horn switch assembly for use in a vehicle steering wheel equipped with an automotive air bag module.

Another object of this invention is to provide a horn switch assembly for use in a vehicle steering wheel equipped with an automotive air bag module wherein the horn switch is attached to the module assembly.

Another object of this invention is to provide a horn switch assembly for use in a vehicle steering wheel equipped with an automotive air bag module wherein the horn switch requires minimal deflection for activation.

Another object of this invention is to provide a horn switch assembly for use in a vehicle steering wheel equipped with an automotive air bag module wherein servicing of the horn switch does not require disassembly of the air bag module which would expose internal components of the air bag module assembly.

Another object of this invention is to provide a horn switch assembly for use in a vehicle steering wheel equipped with an automotive air bag module wherein the horn switch assembly can be replaced without disassembling the air bag module which would expose internal components of the air bag module assembly.

These and other objectives of the invention, which will become apparent from the following description, have been achieved by a novel horn switch assembly comprising, in combination with a vehicle steering wheel including a hub portion and a rim portion, and an inflatable restraint module. The horn blowing switch assembly comprises a plurality of switch means disposed between a first support plate and a second support plate. The switch means are placed on contact points on the top portion of the second support plate and are compressed by corresponding protrusions on the bottom of the first support plate. The two support plates are separated slightly by resilient separator means and are held together by fastener means.

The first support plate has a top portion and a bottom portion, and a first aperture generally in the central region thereof provided for receiving an air bag inflator. A plurality of first protrusions radially outward of the first aperture extend from the bottom portion of the first support plate. A plurality of second apertures are located radially outward of the first aperture. An attachment means is located radially outward of the second apertures for attaching an air bag module cover.

The horn switch assembly further comprises at least one second support plate having a top portion and a bottom portion, and a plurality of third apertures. These third apertures are placed in such a way so as to correspond to the second apertures of the first support plate. A fastener such as a bolt or the like can thus be passed through the second and third apertures to join the first support plate and second support plate. A number of first contact points are on the top portion of the second support plate which correspond in the position of the protrusions of the first support plate. Switch means are disposed on each of the first contact points of the second support plate. The switch means are engaged by the first protrusion of the first support plate, when pressure is applied to the first support plate, and thereby forced against the second support plate.

A number of resilient separators having a generally central aperture are placed between the first support plate and the second support plate. The fastener is then passed through the second aperture, the resilient separator, and the third aperture and secured with a closure means thereby joining the first support plate to the second support plate. The switch means are activated by the movement of the first support plate in the direction of the second support plate so that the protrusions on the bottom of the first support plate compress the switch means.

BRIEF DESCRIPTION OF THE DRAWINGS

With this description of the invention, a detailed description follows with reference being made to the accompanying figures of drawing which form part of the specification, in which like parts are designated by the same reference numbers, and of which.

DETAILED DESCRIPTION OF THE INVENTION

Figure 1:
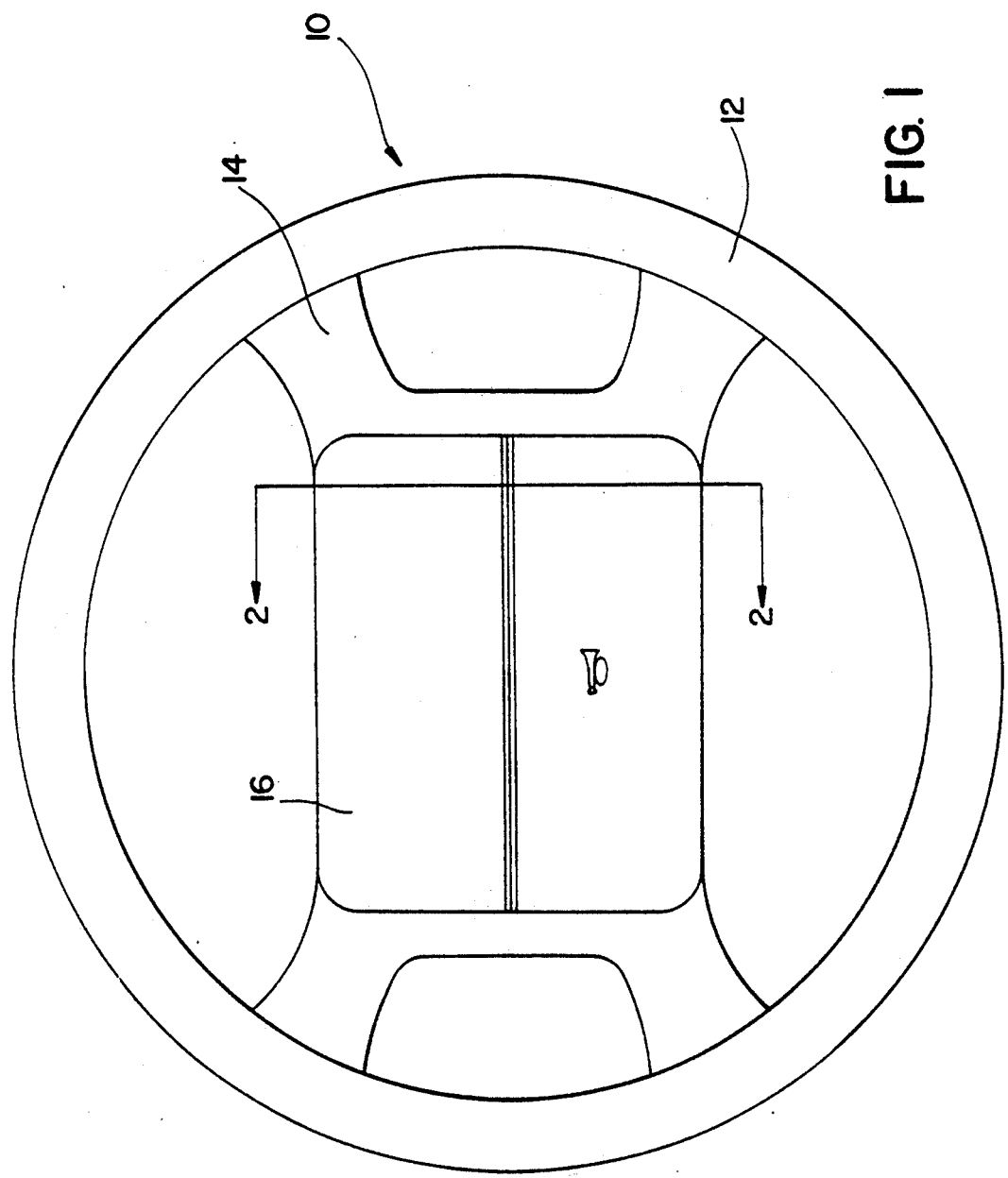
FIG. 1 is a top plan view illustrating a typical driver side steering wheel.
Figure 2:
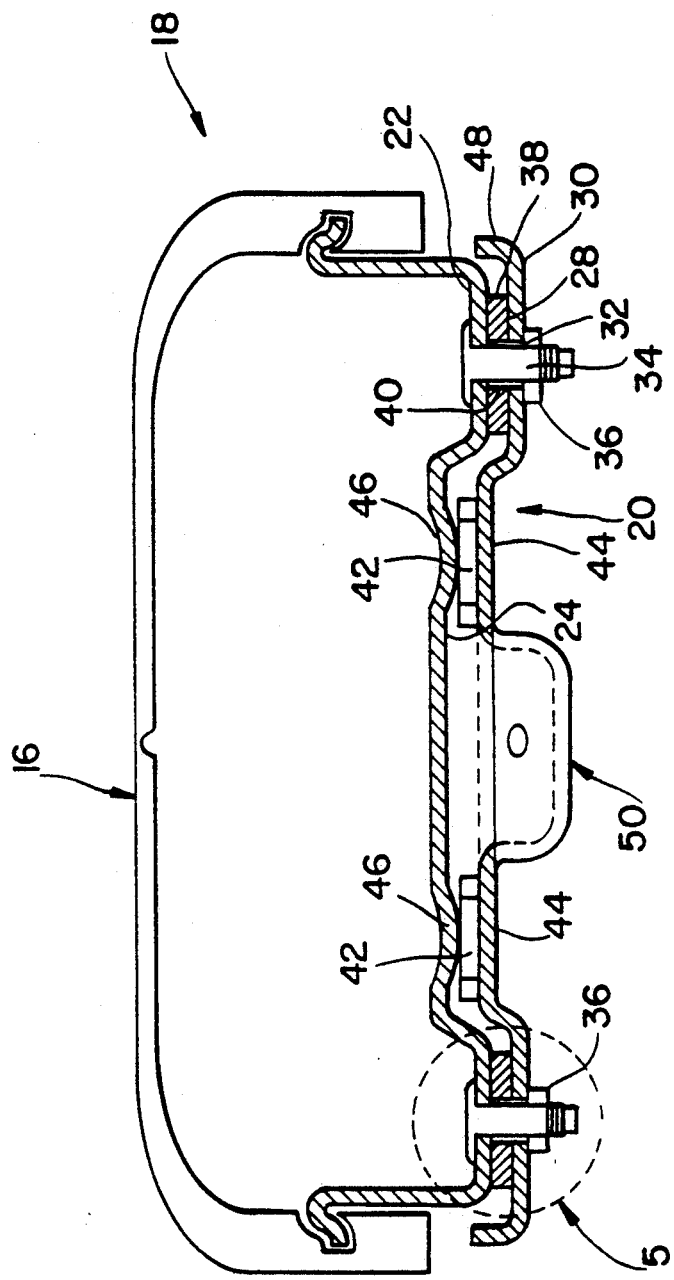
FIG. 2 is a cross sectional view taken along lines 2—2 of FIG. 1, illustrating the placement of horn switches relative to the air bag module.
Figure 3:
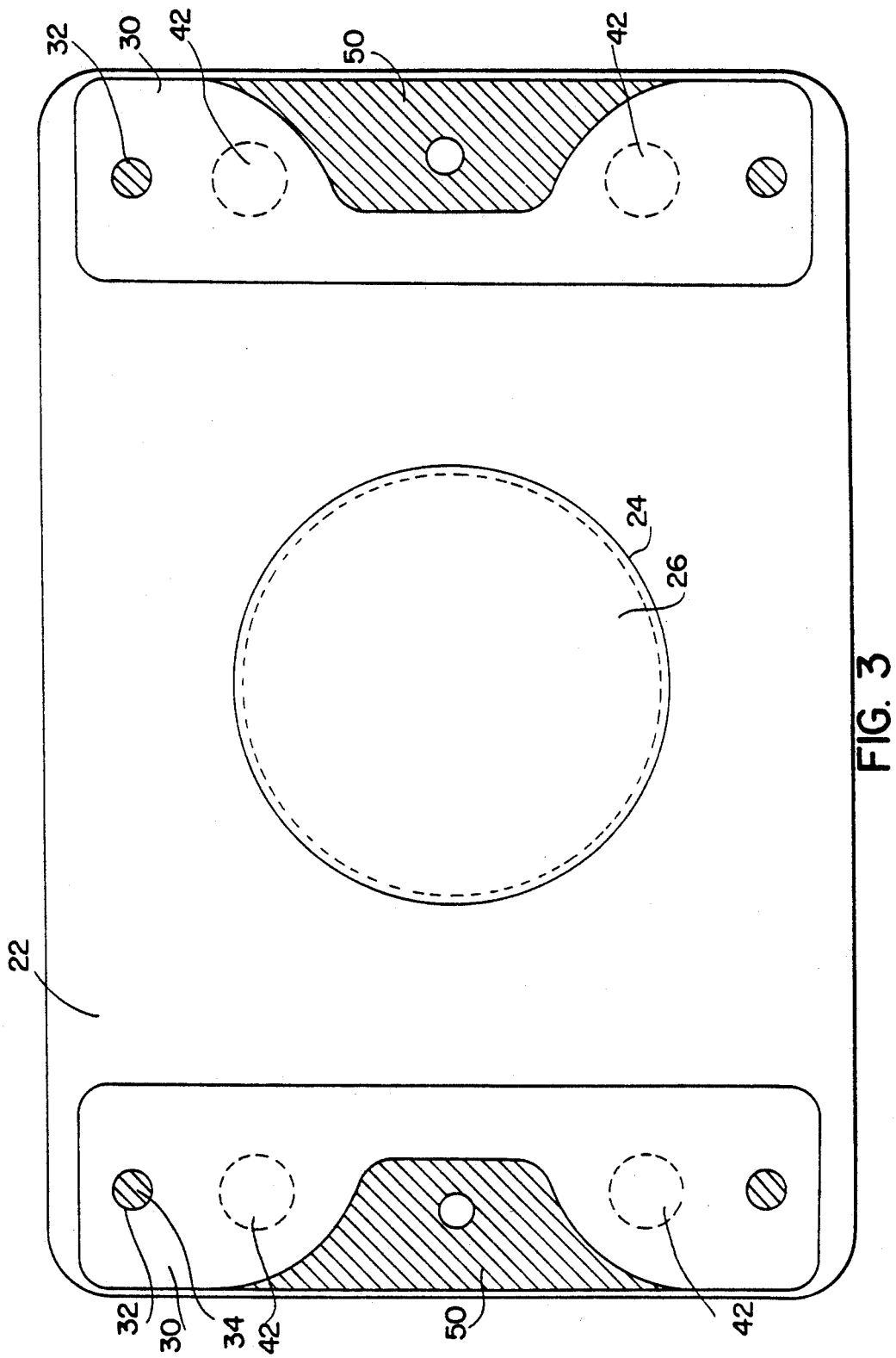
FIG. 3 is a bottom plan view illustrating the relation of a second support plate to a first support plate.

As best seen in FIG. 1, a steering wheel assembly generally at 10 with a rim 12 and spokes 14 and an air bag restraint system cover 16. FIG. 2, taken along lines A—A of FIG. 1, illustrates a cross-sectional view of an air bag module 18 showing a horn switch assembly generally at 20. The air bag cushion is not shown in order to simplify the drawing. The air bag module 18 includes a module housing 22 (hereinafter first support plate), having a first aperture 24 (as shown in FIG. 3) to accommodate an inflator 26, and second apertures 28. The air bag module 18 further includes a second support plate 30 having third apertures 32. The module housing 22 is joined to the second support plate 30 by fastener means 34 which are secured with nuts 36 or the like. A resilient separator means 38 with a fourth aperture 40 in the central region thereof is placed between the module housing 22 and second support plate 26. Horn switch means 42 are disposed between the module housing 22 and the second support plate 30 on contact points 44 of the second support plate 26. The horn switch means 42 are activated by being compressed between protrusions 46 attached to the bottom of the module housing 22 and the contact points 44 of the second support plate 30.

The second support plate 30 has a reinforcement edge 48 and a mounting support 50, as best shown in FIG. 3, which is used for attaching the air bag module 18 to the steering wheel assembly 10. The module housing 22 and the second support plate 30 can be made out of any suitable metal such as steel or aluminum, with aluminum being preferred due to its lower weight. The module housing 22 and the second support plate 30 can be made by stamping the plates out of the above mentioned metals. This provides for a quick and economical means for forming these pieces. The protrusions of 46 of the module housing 22 can be formed by welding small pieces of metal to the bottom of the module housing 22, however, it is preferable that the protrusions be formed in the module housing 22 by the stamping process.

The horn switch means 42 of this invention can be any suitable switch. Preferably a membrane switch or mylar switch, which are commercially available, are used to provide for the minimal deflection of the module housing 18 which is one of the objects of this invention.

Figure 5:
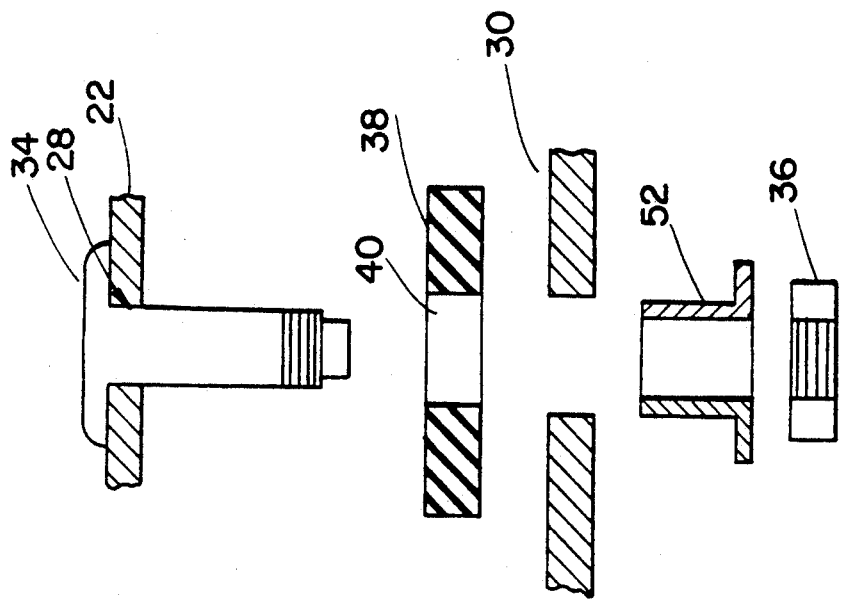
FIG. 5 is an exploded view of section 5 of FIG. 2 illustrating the fastener means and the resilient separator of FIG. 4.
Figure 4:
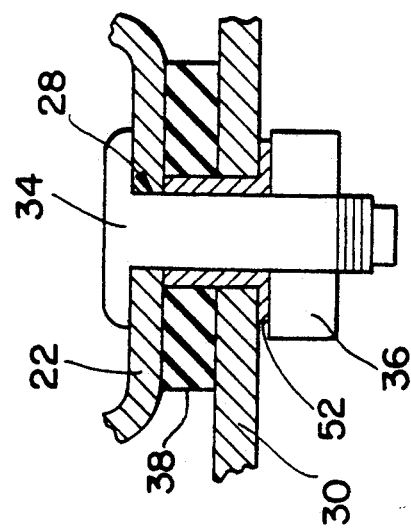
FIG. 4 is a cross-sectional view detailing the fastener means and the resilient separator.
Figure 6:
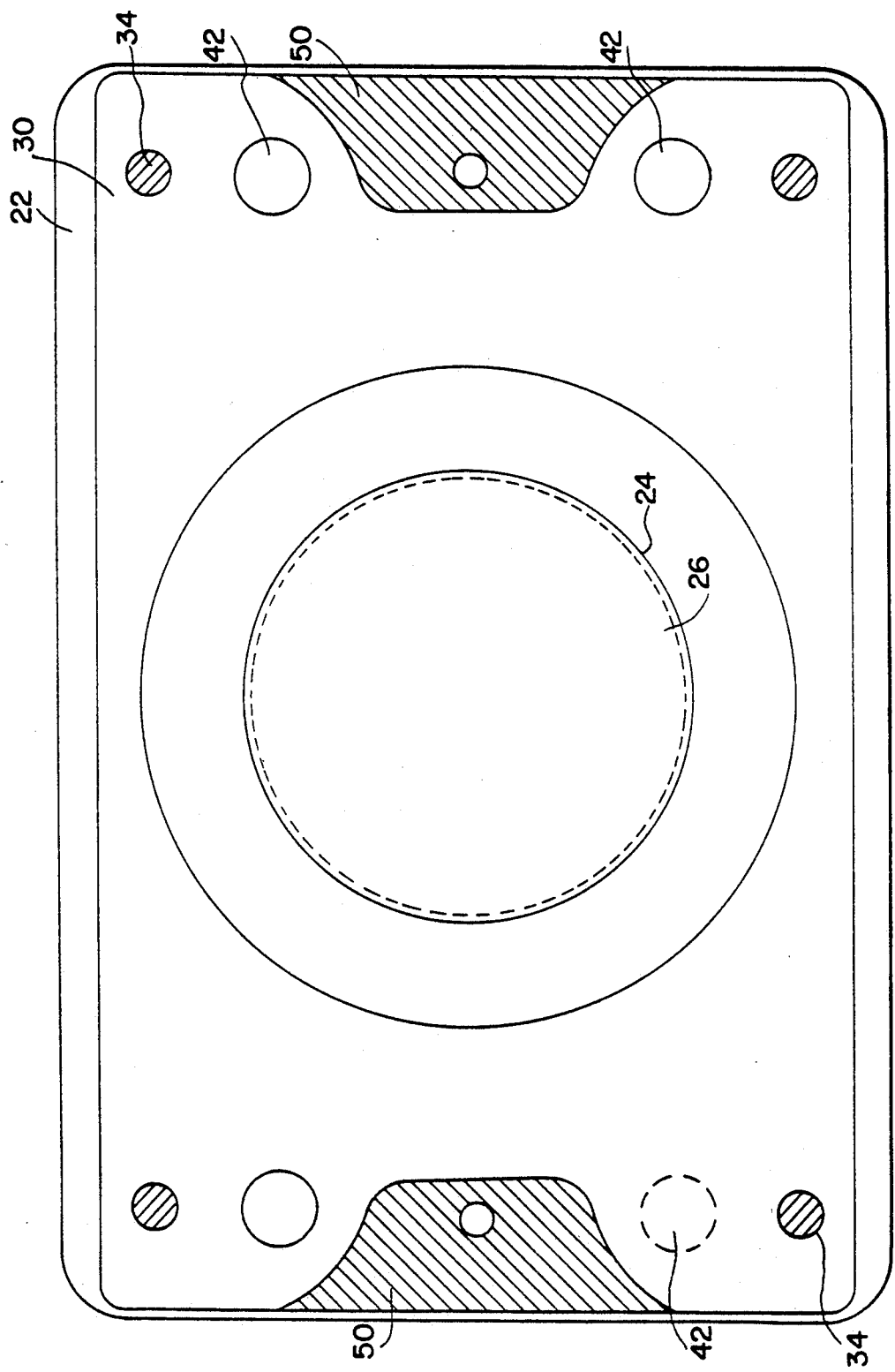
FIG. 6 is a bottom plan view illustrating an alternate second support plate.

A detailed view showing the joining of the module housing 22 to the second support plate 30 is shown in FIG. 4. An exploded view of this assembly is shown in FIG. 5 for clarity. The fastener means 34 preferably a clinch stud is passed through each of the second apertures 28 of the module housing 22. The resilient separator means 38 can be a spring or the like. Preferably a washer or disk made from a resilient elastomeric material such as a synthetic rubber type material, polymeric material or the like is used. This elastomeric material should be capable of withstanding a constant compression while being able to retain it resiliency. The resilient separator means 38 is placed between the module housing 22 and the second support plate 30. The fastener means 34 passes through the second aperture 28 of the module housing 22, the fourth aperture 40 of the resilient separator means 38, and the third aperture 32 of the second support plate 30 and is secured by nuts 36 or the like. The resilient separator means 38 is precompressed by tightening nut 36 to prevent accidental triggering of the horn switch means 42. The combination of precompression of the resilient separator means 38 and the horn switch means 42 is selected to minimize accidental triggering of the horn due to vibration. A bushing 52 or the like may be inserted around the fastener means 4. The second support plate 30 can be made up of two or more plates or can be formed from a single plate as shown in FIG. 6.

During the operation of the automobile the driver can activate the horn switch assembly of this invention by pressing down on the cover 16. The force exerted on the cover 16 compresses the resilient separator means 38 permitting the protrusions 46 attached to the module housing 22 to compress the horn switch means 42 which is attached to an external power source (not shown) thereby activating the horn. The protrusions 46 of the first support plate 22 move in the direction of the contact points 44 of the second support plate 30 from about 0.070 inches (0.18 cm) to about 0.090 inches (0.23 cm) to activate the horn switch means.

Servicing and replacement of the horn switch means 42 can now be accomplished without exposing the air bag module internals. To service the horn switch means 42 the module assembly is detached from the steering wheel 10 by removing fasteners passing through the spokes 4 of the steering wheel 10 and into the mounting support 50. The nuts 36 can be removed and the second support plate 30 taken off exposing the horn switch means 42. The horn switch means can then be serviced or replaced and the second support plate 30 replaced. The module can then be reattached to the steering wheel.

Thus, in accordance with the invention, there has been provided a horn switch assembly for use in a vehicle steering wheel equipped with an automotive air bag module. There has also been provided a horn switch assembly for use in a vehicle steering wheel equipped with an automotive air bag module wherein the horn switch is attached to the module assembly. Additionally, there has been provided a horn switch assembly for use in a vehicle steering wheel equipped with an automotive air bag module wherein the horn switch requires minimal deflection for activation. Further, there has been provided a horn switch assembly for use in a vehicle steering wheel equipped with an automotive air bag module wherein servicing or replacement of the horn switch does not require disassembly of the air bag module which would expose internal components of the air bag module assembly.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

I claim:

1. In combination with a vehicle steering wheel including a center portion and a rim portion, and an inflatable restraint module, a horn blowing switch arrangement comprising:

a first support plate having a top portion and a bottom portion, a first aperture generally in the central region of said first support plate provided for receiving an air bag inflator, a plurality of first protrusions radially outward of said first aperture extending from said bottom portion of said first support plate, a plurality of second apertures radially outward of said first aperture of said first support plate and attachment means radially outward of said second apertures;

a cover attached to said attachment means of said first support plate;

at least one second support having a top portion and a bottom portion, a plurality of third apertures in corresponding relation to said second apertures of said first support plate, and a plurality of first contact points in corresponding relation to said protrusions of said first support;

a plurality of switch means disposed one each of said first contact points of said second support plate and engaged by said first protrusions of said first support plate;

a plurality of resilient separator means having a fourth aperture generally in the central region thereof wherein each of said resilient separators are placed such that each of said fourth apertures are in corresponding relation to each of said second aperture and each of said third apertures between said first support plate and said second support plate;

a fastener means passed through said second aperture, said fourth aperture and said third aperture to join said first support, said resilient separator means, and said second support plate; and wherein the switch means are activated by force exerted on said cover compressing said resilient separator means thereby moving said protrusions of said first support plate in the direction of said first contact points of said second support plate thereby compressing said switch means.

2. A horn blowing switch arrangement of claim 1 wherein each of the plurality of said switch means is a membrane switch.

3. A horn blowing switch arrangement of claim 1 wherein the movement of said protrusions in the direction of said contact plate is from about 0.070 inches (0.18 cm) to about 0.090 inches (0.23 cm).

4. A horn blowing switch arrangement of claim 1 wherein each of the plural of said resilient separator means is a solid disk with said fourth aperture generally in the central region thereof.

5. A horn blowing switch arrangement of claim 4 wherein each of the plurality of said resilient separator means is made from a polymeric material.

* * * * *

UNITED STATES PATENT AND TRADEMARK OFFICE
CERTIFICATE OF CORRECTION

PATENT NO. : 5,283,404
DATED : February 1, 1994
INVENTOR(S) : Prescaro, Jr.

It is certified that error appears in the above-identified patent and that said Letters Patent is hereby corrected as shown below:

At column 4, line 46, "4" should be -- 34 --.

At column 4, line 67, "4" should be -- 14 --.

At column 6, line 11, "one" should be -- on --.

At column 6, line 40, "plural" should be -- plurality --.

Signed and Sealed this

Twelfth Day of July, 1994

Attest:

BRUCE LEHMAN

*Attesting Officer*          *Commissioner of Patents and Trademarks*